United States Patent [19]

Willis

[11] Patent Number: 4,886,349
[45] Date of Patent: Dec. 12, 1989

[54] TEMPLES-LESS EYEGLASS FRAME
[75] Inventor: Michael A. Willis, Dayton, Ohio
[73] Assignee: Michael Allen, Panama City Beach, Fla.
[21] Appl. No.: 125,874
[22] Filed: Nov. 27, 1987
[51] Int. Cl.[4] .......................... G02C 5/14; G02C 5/16
[52] U.S. Cl. .................................... 351/111; 351/114
[58] Field of Search ............... 351/111, 113, 114, 128, 351/129, 123, 126, 66, 44

[56] References Cited
U.S. PATENT DOCUMENTS
3,395,964 8/1968 Neider ................................. 351/126
FOREIGN PATENT DOCUMENTS
29573 of 1911 United Kingdom ................. 351/123

Primary Examiner—Rodney B. Bovernick

[57] ABSTRACT

This disclosure is directed to a temples-less eyeglass frame having a central nose bridge portion, left and right lens frame portions, a left wing portion substantially perpendicular to the left lens frame portion, a right wing portion substantially perpendicular to the right lens frame portion, and left and right resilient foam temple bearing members attached to the inner end surfaces of the left and right wing portions, so as to rest in and exert pressure on both temple area only of the wearer when in use. Although the left and right wing portions can be integral with the left and right lens frame portions, this is not necessary. The left and right wing portions can be hingedly connected to the left and right lens frame portions, respectively, with or without spring-biasing to move the left and right wing portions inwardly when not being worn. The left and right resilient foam temple bearing members can be substantially perpendicular to the left and right wing portions or they can be substantially parallel thereto. The central nose bridge portion of the frame can contain bendable metal permitting the placement of variable inward biasing pressures on the left and right wing portions according to the extent that the metal is bent. Alternatively it can be made in two parts to have separately mating male and female joints, each having raised projections with alternating recesses.

2 Claims, 2 Drawing Sheets

U.S. Patent   Dec. 12, 1989   Sheet 1 of 2   4,886,349
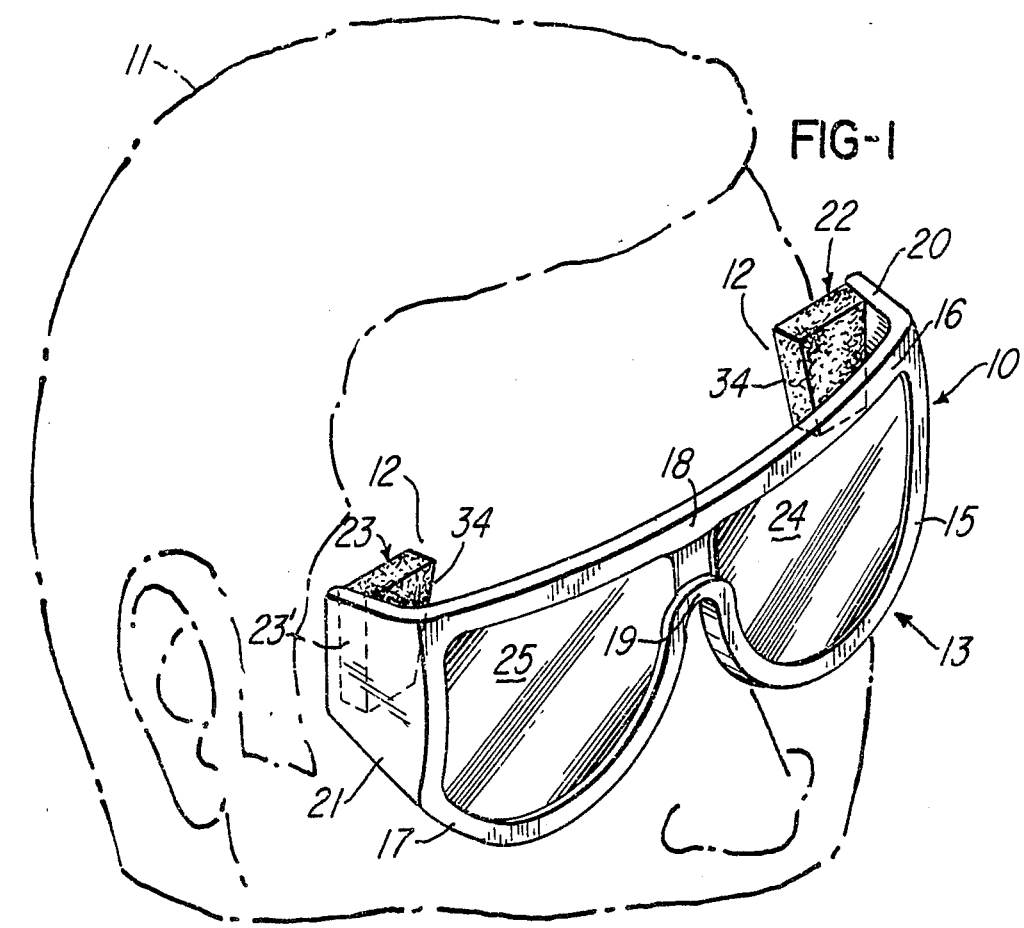
FIG-1
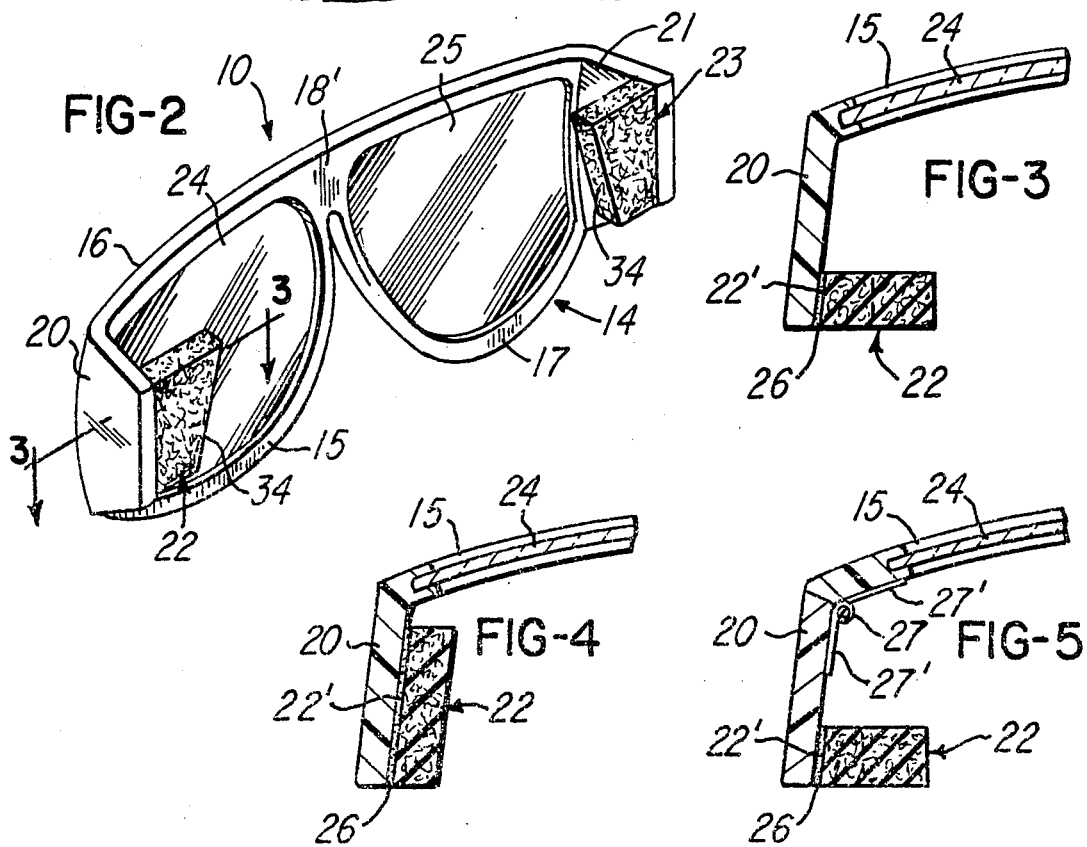
FIG-2
FIG-3
FIG-4
FIG-5

TEMPLES-LESS EYEGLASS FRAME

BRIEF DESCRIPTION OF THE INVENTION

This invention is directed to a temples-less eyeglass frame having a central nose bridge portion, left and right lens frame portions, a left wing portion substantially perpendicular to the left lens frame portion, a right wing portion substantially perpendicular to the right lens frame portion, and left and right resilient foam temple bearing members attached to the inner end surfaces of the left and right wing portions so as to rest in and exert pressure on both temple areas only of the wearer when in use. Although the left and right wing portions can be integral with the left and right lens frame portions, this is not necessary. The left and right wing portions can be hingedly connected to the left and right lens frame portions, respectively, with or without spring-biasing to move the left and right wing portions inwardly when not being worn. The left and right resilient foam temple bearing members can be substantially perpendicular to the left and right wing portions or they can be substantially parallel thereto. The central nose bridge portion of the frame can contain bendable metal permitting the placement of variable inward biasing pressures on the left and right wing portions according to the extent that the metal is bent. Alternatively it can be made in two parts to have separately mating male and female joints, each having raised projections with alternating recesses.

BACKGROUND OF THE INVENTION AND PRIOR ART

In the case of conventional eyeglass frames, "temples", viz., the side members extending from the lens frame outer portions, are hingedly connected to the outer lens-receiving portions of the eyeglass frame. These "temples" extend along the head of the eyeglass frame wearer with downwardly looped portions intended for placement on the inner crease of the junction between the wearer's ear and the outer portion of the head. These conventional temples, strangely enough, contact but little of the wearer's temple areas on both sides of the head . when the conventional eyeglass frames are worn. Most of the contact is actually made with the areas of the wearer's head behind the temples. In this sense calling them "temples" is somewhat of a misnomer. Constant wearing of these conventional eyeglass frames often results in unsightly creases in the skin and tissue on both sides of the head, most of which is located behind the temples and rearwardly to the outer portion of the junction with the ears. This pressure can become irritating to the wearer and can even cause permanent creases in the areas of contact upon wearing of the conventional eyeglass frames over an extended period of time. The pressures on both sides of the head can also cause discomfort to the wearer, e.g., headaches, etc. The present invention overcomes most of the disadvantages attendant to the wearing of conventional eyeglass frames because the eyeglass frames of he present invention are temples-less. U.S. Pat. No. 715,533 issued to James C. Anderson is directed to eyeglass or spectacle frames wherein the lens frames are rigidly connected by a nose bridge and having side bows hinged to the lens frame by a joint of limited movement. These bows have an outward curved portion at C between points 1 and 3 which contacts and conforms to the convexity of the frontal bone of the head and are provided at their free ends with substantially rectangular eyes 4 so as to rest with no appreciable pressure in a cavity existing between the front and rear boundaries of the malar bone of the skull when worn by the wearer.

BRIEF DESCRIPTION OF THE DRAWINGS

FIG. 1 of the drawings is a fragmentary perspective view illustrating eyeglass frames of this invention from a frontal perspective positioned upon the head of the wearer showing environment of use.

FIG. 2 is a rear perspective view of the eyeglass frames of this invention.

FIG. 3 is a fragmentary cross-sectional view of the left side of the eyeglass frames of this invention illustrated in FIG. 2 taken along lines 3—3 of FIG. 2.

FIG. 4 is a fragmentary cross-sectional view similar to that of FIG. 3, but showing a modification thereof.

FIG. 5 is a fragmentary cross-sectional view similar to those of FIGS. 3 and 4 showing yet another modification of the eyeglass frames of this invention.

DETAILED DESCRIPTION OF THE INVENTION

Figure 6:
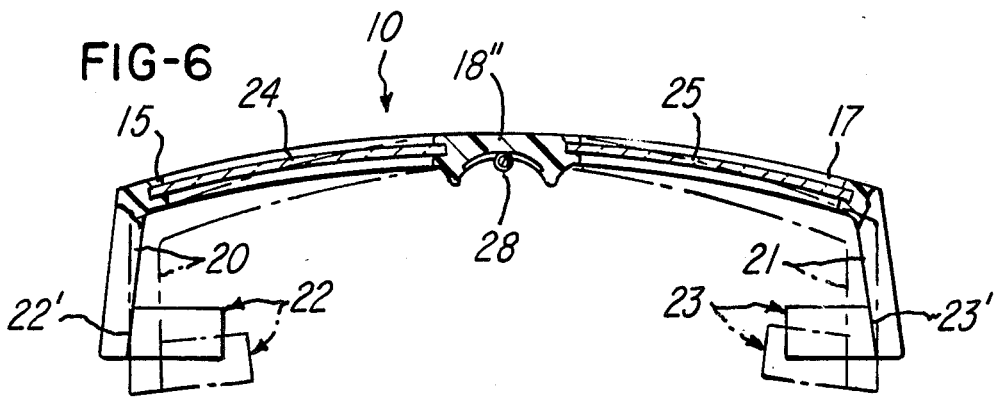
FIG. 6 is a fragmentary view from the top of the glass frames with parts in cross section and showing an adjusted position in phantom line. This is a further modification of the invention.

As will be apparent from the figures of the drawings, the eyeglass frames 10 of this invention lack the conventional "temples" members customarily associated with eyeglass frames. Instead, as shown in FIG. 1, eyeglass frames 10 are worn in the temple areas 12 of the wearer's head 11. Eyeglass frames 10 have a left lens frame portion 15 and corresponding right lens frame portion 17 located on either side of the upper horizontal frame portion 16. The upper central nose bridge portion 18 and lower central nose bridge portion 19 complete the front portion of the eyeglass frame as viewed from the front 13 thereof.

The rear 14 of the eyeglass frames is shown in FIG. 2 of the drawings. In the rear of upper central nose bridge portion 18 and lower central nose bridge portion 19, the frames of this invention can have a central nose bridge connector portion 18' as shown in FIG. 2. Moreover the entire central nose bridge portion can be one (integral) piece as shown at 18" in FIG. 6.

In either case, the eyeglass frames of this invention contain a left wing frame member 20 and a right wing frame member 21 to which are attached a left resilient foam temple bearing member 22 and a right resilient foam temple bearing member 23, respectively. This resilient foam material can be natural rubber sponge or foam or a plastic foam material, e.g., polyurethane foam.

As shown in FIGS. 1 and 2, left resilient foam temple bearing member 22 is attached to inner end surface 22' of left wing frame member 20 and right resilient foam temple bearing member 23 is attached to inner end surface 23' of right wing frame member 21. Both resilient foam temple bearing members can have a downward taper (or downward curvature) from top to bottom as shown at 34. Thus it will be observed that these left and right resilient foam temple bearing members rest in and exert pressure on both temple areas only of the wearer when in use.

Left and right eyeglass lenses 24 and 25, respectively, rest in their respective lens frame portions. These lenses can be tinted or colored for sunglasses, clear and/or prescription or magnifying lenses.

Referring to FIG. 3 of the drawings, the left wing frame member 20 can be made to be integral with the left lens frame portion 15. Adhesive 26 can be used to secure (attach) the left temple bearing member 22 to the left wing frame member 20 at its inner end surface 22'. In this embodiment the compression of the resilient foam left and right temple bearing members 22 and 23 are sufficient to keep the glass frames on the head of the wearer at both temples.

In the embodiment of FIG. 4 of the drawings, the left resilient foam temple bearing member 22 is attached so as to be substantially parallel with left wing frame 20 whereas in FIGS. 3, 5 and 6, the left temple bearing member 22 is attached substantially perpendicular to the left wing frame 20. Of course, it should be realized that the same is true of the right hand portion of the frames of this invention.

In the modification shown in FIG. 5, a hinge 27 which can be, and preferably is, spring-biased as shown at 27' serves to move the left wing frame member 20 inwardly when not being worn. A similar hinge with spring biasing (not shown) is located at the right hand juncture of the right wing frame portion 21 with its corresponding right lens frame portion 17

According to another embodiment of this invention, as shown in FIG. 6, the integral, one piece central nose bridge portion 18" has attached thereto, or embedded therein, a central nose bridge hinge 28, which can be, and preferably is, springbiased so as to move left wing frame member 20 with left resilient foam temple bearing member 22 and right wing frame member 21 with its attached right resilient foam temple bearing member 23 inwardly, viz., toward one another, when not being worn. This is shown in phantom line in FIG. 6. Then when desired to be worn, the frames 10 are placed in both temple areas of the wearer causing outward pressure due to the spring-biased hinge 28, thereby assuring that they will remain upon the head of the wearer.

Figure 7:
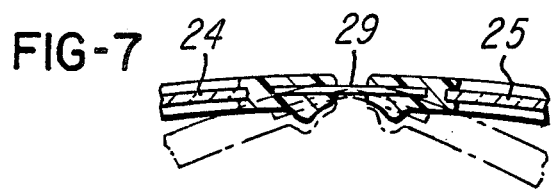
FIG. 7 is a fragmentary cross-sectional view looking down on the central nose bridge portion of the eyeglass frames showing another modification of the invention with bent position in phantom line.

FIG. 7 illustrates a still further modification of the structure of this invention involving a bendable metal nose bridge portion 29. Depending upon the extent of bending of the bendable metal nose bridge portion 29, the pressure tightness, and hence the fit, of the eyeglass frames of this invention can be varied to suit the individual wearer. Moreover, the level of tightness exerted by the resilient foam left and right temple bearing members 22 and 23, respectively, can be varied at will by the wearer, e.g., depending upon what activities the wearer is undergoing when wearing the eyeglass frames.

Figure 8:
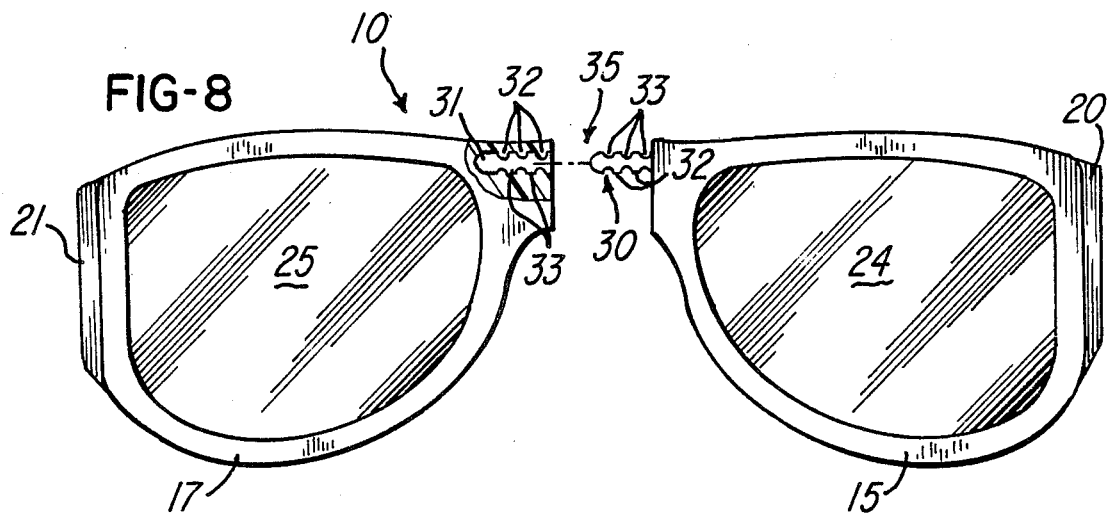
FIG. 8 is an exploded frontal view showing a removable adjustable joint at the central nose bridge portion of the eyeglass frames and represents another modification of this invention.

A still further modification of the eyeglass frames of this invention is illustrated in FIG. 8 of the drawings. It will be observed that the eyeglass frames 10 can contain a removable, adjustable joint 35 formed of male joint member 30 and female joint member 31, each having raised projections 32 alternating with recesses 33 to form a mating unit at the points of meeting of the raised portions and recesses. Furthermore, depending upon which raised projections are located within which recesses, the resilient pressure exerted by resilient foam left and right temple bearing members 22 and 23, respectively, can be varied. For example, in the frontal view shown in FIG. 8, the further the male joint member 30 is inserted into the female joint member 31, the greater will be the resilient level of pressure exerted upon the temple areas of the wearer, thereby resulting in a tighter fit of the eyeglass frames 10 on the temple areas 12 of the wearer.

Using the eyeglass frames embodiment shown in FIG. 8, if a wearer has a plurality of sets of eyeglasses with each pair of lenses having the same color, the left lens frame with its lens of one color or tint can be combined with a right lens frame with its lens of a different color or tint for a pair of eyeglasses, e.g., sunglasses having differently colored lenses. This enables the wearer to have greater flexibility and more varied fashion options. One curious advantage of the eyeglass frames of this invention is that they have been worn by the inventor for extended time periods without noticeable discomfort. While the reason(s) for this are not understood, it may be that the positive pressure on both temples of the wearer has a therapeutic effect.

What is claimed is:

1. A temples-less eyeglass frame comprising a central nose bridge portion having separate but mating male and female joints, each having raised projections with alternating recesses, left and right lens frame portions, a left wing portion substantially perpendicular to said left lens frame portion, a right wing portion substantially perpendicular to said right lens frame portion, and left and right resilient foam temple bearing members attached to the inner end surfaces of said left and right wing portions, said members resting in and exerting pressure on both temple areas only of the wearer when in use.

2. A temples-less eyeglass frame comprising a central nose bridge portion having separate but mating male and female joints, each having raised projections with alternating recesses, left and right lens frame portions containing lenses of different color or tint, a left wing portion substantially perpendicular to said left lens frame portion, a right wing portion substantially perpendicular to said right lens frame portion, and left and right resilient foam temple bearing members attached to the inner end surfaces of said left and right wing portions, said members resting in and exerting pressure on both temple areas only of the wearer when in use.

* * * * *